H. O. DARR.
DIFFERENTIAL LOCKING MECHANISM.
APPLICATION FILED DEC. 9, 1919.

1,338,720.

Patented May 4, 1920.

Inventor
Harry O. Darr
By J. M. St. John
Atty.

UNITED STATES PATENT OFFICE.

HARRY O. DARR, OF NEAR MARION, IOWA.

DIFFERENTIAL-LOCKING MECHANISM.

1,338,720.     Specification of Letters Patent.     Patented May 4, 1920.

Application filed December 9, 1919. Serial No. 343,627.

*To all whom it may concern:*

Be it known that I, HARRY O. DARR, a citizen of the United States, residing near Marion, in the county of Linn and State of Iowa, have invented certain new and useful Improvements in Differential-Locking Mechanism; and I do hereby declare the following to be a full, clear, and exact description of the invention, such as will enable others skilled in the art to which it appertains to make and use the same.

This invention relates to the differential driving gear of motor vehicles, particularly automobiles, the object of the invention being to produce means whereby the differential may be locked so as to force concurrent motion of both drive-wheels simultaneously, and for easily releasing the lock when such concurrent movement is not needed.

In the driving of an automobile it often happens that the traction of both driving wheels is needed to get the car out of difficulty, or to obtain the maximum of tractive power. One hind wheel, for example, may have dropped into a muddy rut. Power being applied, this wheel simply revolves in the soft mud, and as a result practically no power is applied to the other wheel, which may be on a good piece of road, with traction enough to pull the car out of the rut if the power of the engine can be transmitted positively to it. This invention provides means whereby both sections of the driving axle may be temporarily locked together, so that the entire axle may operate as a single unit.

Figure 1:
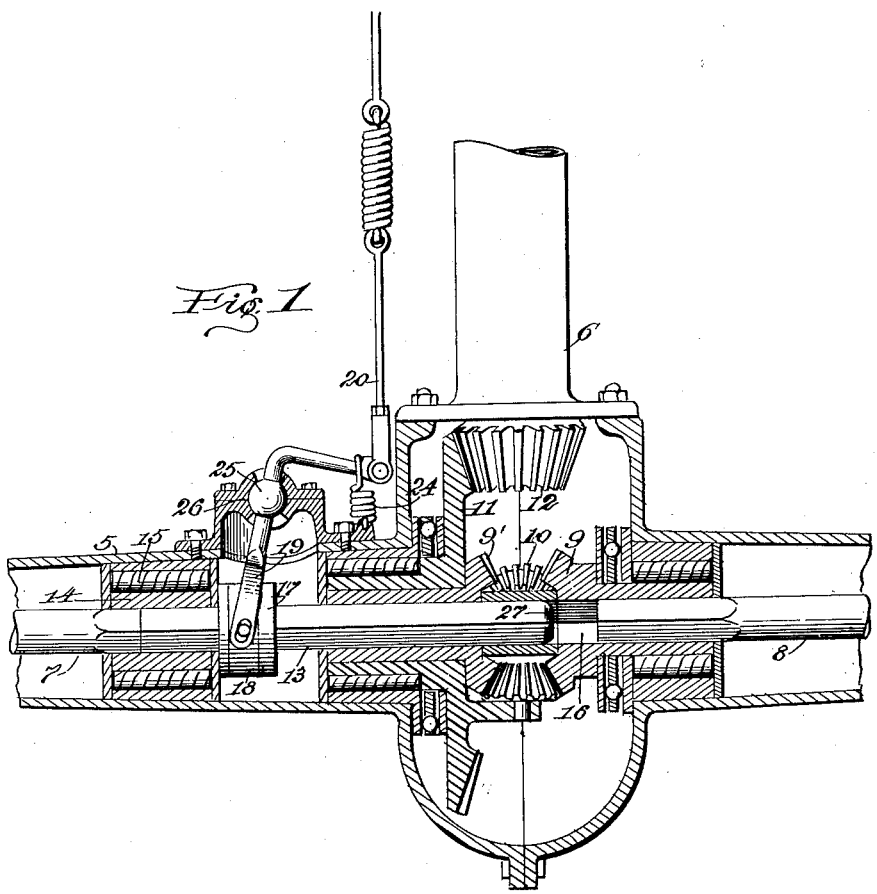
Figure 2:
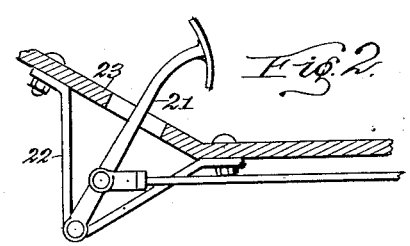

In the accompanying drawing, forming a part of this specification, Figure 1 is a sectional view of a differential gear and its connections, and showing the locking mechanism therefor. Fig. 2 is a fragmentary side elevation showing a foot-lever and connecting-rod for actuating the differential lock.

In the drawing, the numeral 5 denotes the rear axle housing, and 6 the torque tube of an automobile. The separate axles 7 and 8 are driven by the usual differential bevel gears 9, 10, 11 and 12, in a manner so familiar as to require no particular description. To meet the requirements of the invention, however, important modifications are involved in the form and construction of some of the parts, as will appear in the description following.

Instead of the usual two parts, the axle is composed of three sections, 7 and 8, as above noted, and an intermediate section 13. This and the section 7 are coupled to act as a unit at all times by a sleeve 14, which should be provided with a suitable bearing 15 in the axle housing. Preferably the sleeve is provided with a square hole, in which is set the end of the axle 7, similarly squared. In the remaining portion of the sleeve is slidably mounted one end of the square section of shaft 13. The other axle, 8, is similarly set in the square hole of the driving pinion 9, leaving a vacant space at 16 to serve as a socket for the end of the slide-shaft 13, which is free to slide in the squared hole in the other driving pinion 9'. It is evident that in the position shown in Fig. 1 the differential will operate in the usual way, but if the slide-shaft is slipped to the right, into the socket of the driving pinion 9, both pinions will be forced to act as a unit. For this purpose the slide-shaft is provided with a grooved collar 17, to the ring 18 of which is pivoted a forked lever 19, here shown as of the bell-crank type, and connecting by a link-rod 20 with a foot-lever 21 pivoted to a bracket 22 under the foot-board 23. A spring 24 draws the parts to the position shown.

It is desirable that the opening in the axle housing for the shift-lever be closed so as to exclude road-dust, and also to provide for the automatic lubrication of the lever from the inside of the housing. This is effected preferably by forming the working pivot of the lever as a ball 25, and seating it in a socket bearing 26, bolted to the axle housing. The construction is such as to be readily applied to many axle housings in general use, and with or without modifications may be applied at the factory to new automobiles.

Under some circumstances the locking shaft may need to be shifted while the motor is operating slowly, or not at all, and to enable it to shift as easily as possible the end which enters the pinion socket should be somewhat rounded or tapered as shown at 27.

To engage the locking shaft requires of course a push of the foot-lever, the foot being kept on the lever until the locking of the axles is no longer required. It may then be released and the disengagement of the lock takes place automatically, through the action of the retractile spring, as soon as the driving sections of the axle cease to exert a twisting strain upon each other, as would take place at the first turning movement of the car.

Having thus described my invention, I claim:

1. In a differential gear, the combination of independent driving axles, an interlocking, intermediate axle section, and means for shifting said intermediate section into and out of locking engagement with the others.

2. In a differential gear, the combination of independent driving axles, an intermediate axle section in permanent but sliding engagement with one of the driving axles, and means for shifting the intermediate axle section into and out of engagement with the other axle.

3. In a differential gear, the combination of independent axles, driving gears therefor, an intermediate section of axle slidable in one of said gears and into a socket of the other gear, and means for shifting said section of axle.

4. In a differential gear, the combination of independent driving axles having angular terminals, a pinion attached to one of the terminals, a sleeve attached to the other, a driving pinion therefor, and a section of angular axle slidable in the sleeve and the latter pinion, and adapted to engage the first named pinion, and means for shifting said section of axle.

5. In a differential gear, the combination of independent driving axles, driving pinions therefor, an intermediate angular section of axle slidable through one pinion and into the other, a socket-sleeve connecting the other end of the axle section permanently with one of the axles, a shift-lever connecting operatively with the intermediate axle section, an operating lever, and a link-rod connecting said levers.

6. In a differential gear, the described locking mechanism, comprising independent driving axles and pinions, an intermediate axle section in operative, sliding connection with one axle and pinion and adapted to engage a socket in the other pinion, a shift-lever therefor, a housing fulcrum for said lever, an operating lever and rod connecting the same with the shift-lever, and a spring to disengage the lock.

In testimony whereof I affix my signature in presence of two witnesses.

HARRY O. DARR.

Witnesses:
F. W. ARMSTRONG,
J. M. ST. JOHN.